United States Patent Office 3,455,108
Patented July 15, 1969

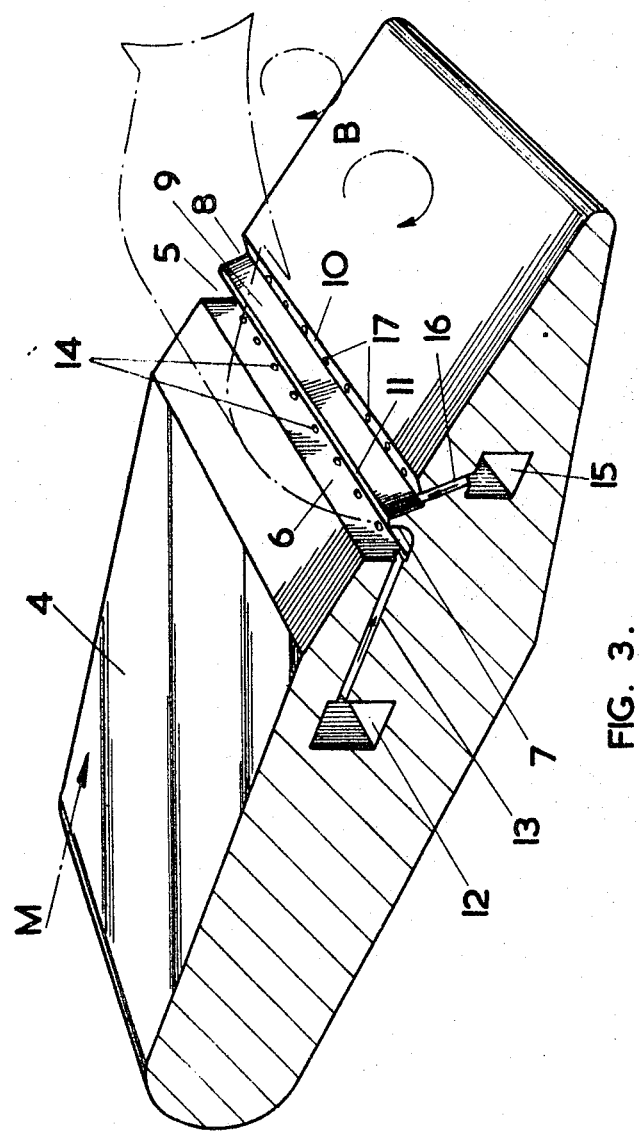

3,455,108
COMBUSTION DEVICES
Harold Clare, Farnborough, England, and Michael Sherwood, Stratford, Conn., assignors to Minister of Technology in Her Britannic Majesty's Government of the United Kingdom of Great Britain and Northern Ireland, London, England
Filed Feb. 27, 1967, Ser. No. 618,604
Claims priority, application Great Britain, Feb. 28, 1966, 8,649/66
Int. Cl. F02g 3/00
U.S. Cl. 60—39.72                            7 Claims

ABSTRACT OF THE DISCLOSURE

Air discharged into a transverse recess in the surface of a vane is diverted into airflow passing over the vane to cause separation of the flow and produce an aerodynamic baffle effect. Liquid fuel discharged into a second recess located downstream of the first is directed towards the separated flow by which it is entrained and atomized. Some of the air may be directed into the second recess to give improved atomization.

---

The present invention relates to combustion devices wherein a flame stabilization zone is formed in a swiftly moving gas stream by injecting a sheet-like screen of gas transversely to the direction of flow of the gas stream.

Such devices are generally known as aerodynamic flame stabilizers and are particularly suitable for use where combustion is required only occasionally. Thus, fixed baffles which would lead to undesirable pressure losses at other times are rendered unnecessary.

In aircraft gas turbine jet propulsion engines extra power can be developed by burning additional fuel in an afterburner or, in the case of a bypass engine, in the duct through which a cold stream of air normally by-passes the turbine.

Hitherto it has been the more usual practice in gas turbine combustion systems for fuel to be both injected into the gas stream and atomized upstream of flame stabilizers, whether of the solid or aerodynamic type. In the case of the latter it has been found that there is a local weakening of the combustible mixture strength in the recirculation zone which may be due to entrainment of gas from the sheet.

The present invention utilizes the gas sheet of an aerodynamic flame stabilizer to atomize fuel which is injected into the combustion system at substantially the same location as the gas which forms the sheet.

A combustion device according to the invention comprises a body having an aerodynamic surface, fluid pressure means whereby a gas flow over the surface is induced to separate therefrom and means immediately downstream of the separation point for directing liquid fuel towards the separated flow for atomization by the said fluid pressure means.

More particularly the surface is formed with adjacent elongated transverse recesses having a deflector between them, high pressure air is introduced into the forward recess to be discharged therefrom at an angle to the direction of the gas flow over the surface, and liquid fuel is discharged forwardly from the rearward recess to impinge on high pressure air flowing over the deflector.

Figure 1:
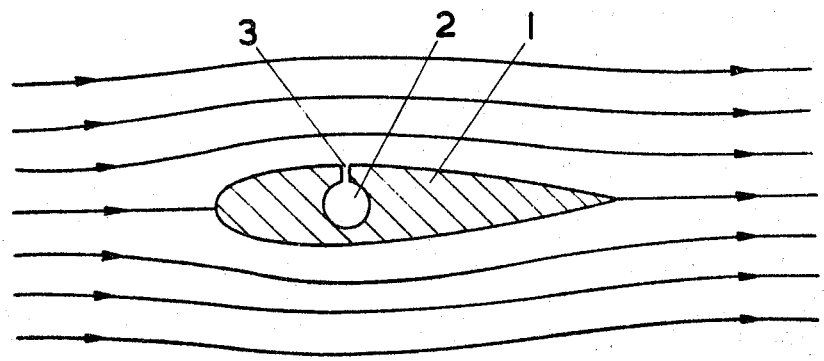
Figure 2:
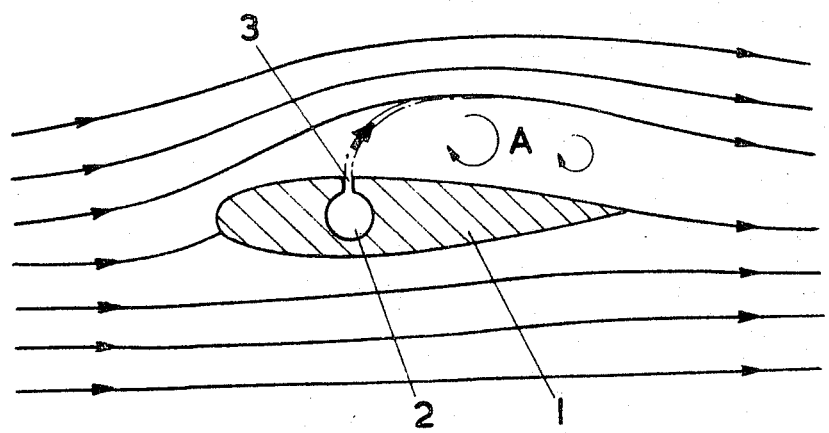
Figure 3A:
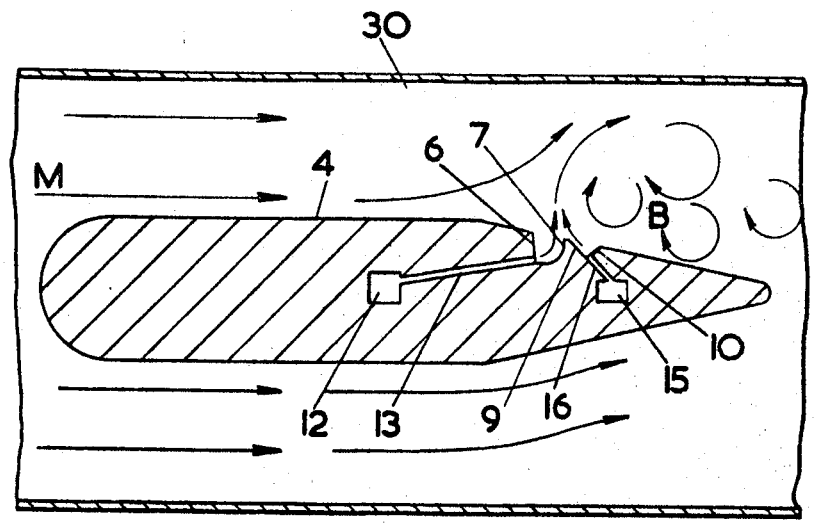
Figure 4:
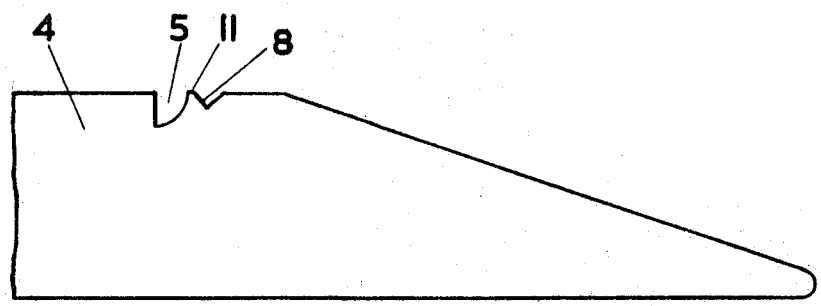
Figure 5:
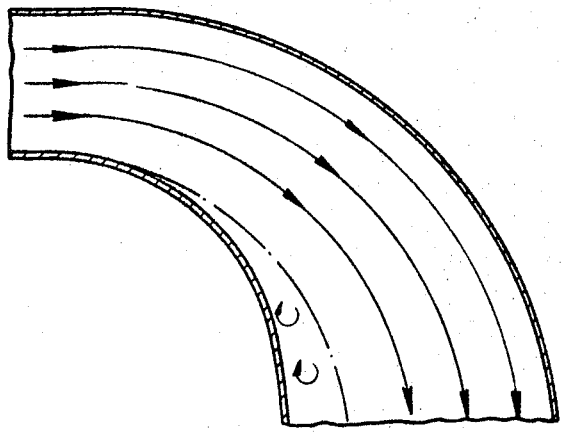
Figure 6:
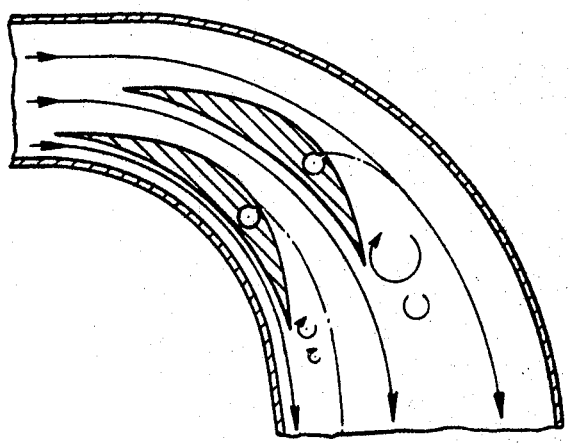
Figure 7:
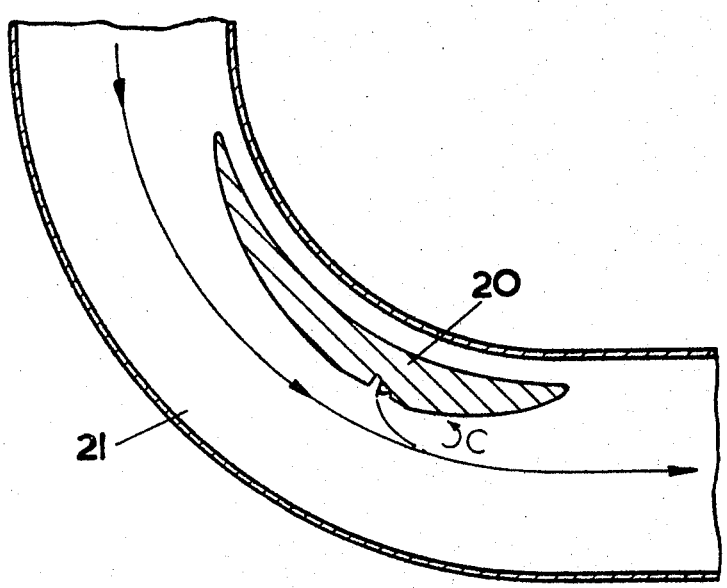
Figure 8:
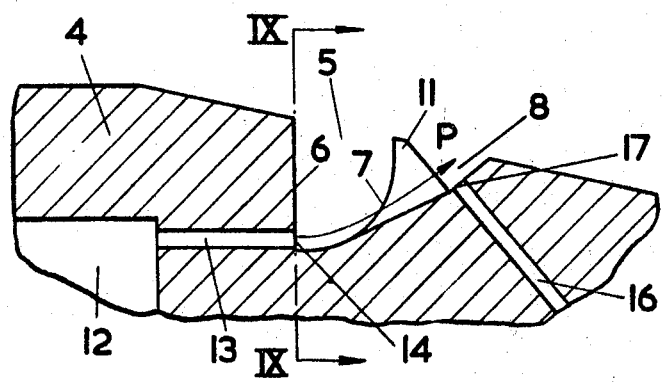
Figure 9:
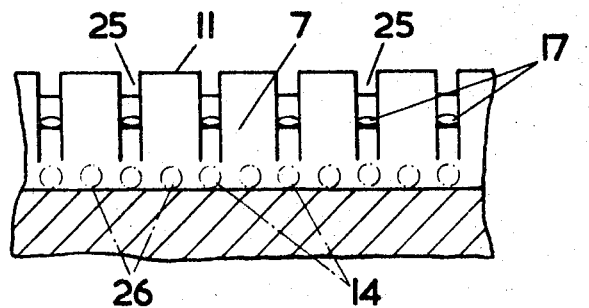

Various embodiments of the invention will now be described by way of example with reference to the accompanying diagrammatic drawings of which:

FIGURES 1 and 2 are illustrative of the principles of aerodynamic stabilization, FIGURE 3 is a sectioned perspective view of a combustion device according to the invention, FIGURE 3A is a sectional elevation of the combustion device of FIGURE 3 positioned in an airflow duct, FIGURE 4 is a section through a part of an alternative form of combustion device to that of FIGURE 3, FIGURE 5 illustrates fluid flow in a bend, FIGURE 6 illustrates means for improving fluid flow in a bend in conjunction with aerodynamic stabilizers, FIGURE 7 is a sectional elevation of a further alternative form of combustion device, FIGURE 8 is a partial sectional view of a modification of the invention, and FIGURE 9 is a view taken on the line IX—IX in FIGURE 8.

FIGURE 1 shows the undisturbed pattern of airflow around a vane 1 of streamline form. The vane has an internal air duct 2 connected to a slot 3 formed in the upper surface of the vane and when high pressure air from the duct is discharged from the slot at an angle to the direction of the airflow, as shown in dotted lines in FIGURE 2, the airflow is induced to separate from the surface of the vane. The separation gives rise to a localized region of flow reversal (turbulence) A, similar to that existing behind a bluff body in a fluid stream. Local turbulence, as is well known, may be used to advantage in stabilizing a flame.

Referring now to FIGURES 3 and 3A, a vane 4 is positioned in an airflow duct 30 and has a quadrant-shaped groove 5 extending transversely across its upper surface. The groove has a flat front side 6 disposed vertically and an opposite curved rear side 7, the sides being joined at the base of the groove.

A parallel V-shaped groove 8 having its sides 9 and 10 perpendicular to one another extends across the vane slightly downstream of the first so as to provide a pronounced upstanding lip 11 between the two grooves.

A gallery 12 extending through the vane is connected to a high pressure air supply (not shown). Ducts, as 13, extend rearwardly from the gallery to the groove 5 where they terminate in a row of holes 14 spaced along the lower edge of the front side 6.

A further gallery 15 is connected to a fuel supply (not shown) and by upwardly inclined ducts, as 16, to the groove 8. The ducts run parallel to the front face 9 of the last-mentioned recess and terminate in holes 17 spaced along the rear face 10.

There is the same number of air ducts 13 and of fuel ducts 16, one of each being located in the same longitudinal vertical plane. Thus, each air hole 14 faces a fuel hole 17 though on opposite sides of the lip 11.

In operation, high pressure air is supplied to the gallery 12 whence it passes through the ducts 13 to be discharged through the holes 14. These holes act as nozzles whereby the air is directed rearwardly at the curved rear side, or anvil, 7 of the groove 5. The air is diffused on the anvil and is deflected upwards as a sheet into a main stream flowing over the vane in the direction of the arrow M. The sheet induces the main flow to separate from its normal path over the vane as indicated in dotted lines giving rise to turbulence in the region B.

Liquid fuel supplied to the gallery 15 is discharged forwardly and upwardly through the holes 17 to meet the air sheet after it passes over the edge of the lip 11. The fuel streams are shattered by the blast of the high pressure air to form a finely atomized mist of fuel and air which is carried into the turbulent zone B where steady combustion will take place after ignition by conventional means.

Various modifications of the form of the vane are possible. Whereas that shown in FIGURE 3 is symmetrical with recesses in the tapering rear portion, an asymmetric section may be used having recesses formed in a parallel portion of the vane as shown in FIGURE 4, in which the reference numerals are the same as are used in FIGURE 3. A double-sided arrangement is another alternative with air sheets being discharged from both the upper and the lower surfaces of a vane to form separate flame-stabilization zones.

Moreover, the anvil (i.e., rear side 7 of the groove 5) need not be purely quadrantal but may be a flat surface set at an angle or a combination of flat surfaces, provided that the air sheet is discharged substantially normally to the main stream flowing over the vane. Another requirement which is believed to be essential is that the edge of the lip over which the air sheet is discharged extends to the line of the main flow, otherwise a Coanda effect may be set up causing a depression behind the lip which will reduce or obviate flow separation at this point.

The invention is also advantageous where combustion is required in the bend of a duct. Such a case occurs where it is desired to improve the takeoff performance of an aircraft fitted with thrust vectoring means involving the use of swivelling propulsion nozzles. Two pairs of nozzles are frequently used, turbine efflux being discharged from one pair and by-pass air from the other; the nozzle outlets are usually curved to divert the propulsive flow through an angle.

FIGURE 5 shows fluid flow in a curved duct from which it may be seen that there is a tendency to separation on the inside leading to an undesirable pressure loss.

In FIGURE 6, curved vanes incorporating aerodynamic stabilization means have been inserted in the duct. Even when air is being discharged, as in the case of the upper vane, an improved flow is apparent.

Referring now to FIGURE 7, a curved vane 20 is installed in an airflow duct 21. The vane is provided in its undersurface with an arrangement of grooves as described in relation to FIGURE 3 to which air and fuel is supplied in similar fashion. Flow separation occurs as indicated in dotted lines to give a turbulent zone C in which steady combustion will be maintained.

In the case of a curved duct it has been found that, under certain conditions, variations of fuel/air ratio have occurred in the combustion zone. Large drops of fuel pass through the air sheet without being fully atomized. In a straight duct these will be caught up by the main flow and carried back into the combustion zone where they will be burned. However in the case of a curved duct the centrifugal force induced by the diversion of a swiftly moving airstream acts on large drops of fuel to fling them against the outer walls of the duct where they are lost to the combustion process.

To improve the atomization of the fuel and thus obviate this effect, narrow slots 25 are cut through the lip 11 between the two grooves, as in FIGURES 8 and 9. The slots are located between the air ducts 13 and the fuel ducts 16 so that air from the holes 14 (shown dotted in FIGURE 9) is directed through the said slots to atomize the fuel issuing from the holes 17. Additional ducts (not shown) lead from the gallery 12 to terminate in holes 26 situated between the holes 14 in the front side 6 of the groove 5.

Air discharged from the holes 26 is directed at that part of the anvil 7 between the slots to be diverted upwardly thus maintaining an air sheet. In the event of any fuel being incompletely atomized by the high pressure air passing through the slots, the process should be completed by the air sheet.

This last arrangement may, of course, be used in vanes situated in straight ducts to give improved atomization.

We claim:
1. A combustion device comprising a body having an aerodynamic surface, adjacent elongated traverse recesses formed in the surface, a deflector formed between said recesses, means for introducing high pressure air into the forward recess to be discharged therefrom over the deflector at an angle to the direction of gas flow over the surface, and means for introducing liquid fuel into the rearward recess to be discharged forwardly therefrom to impinge on high pressure air flowing over the deflector and be atomized thereby.

2. A combustion device according to claim 1 comprising a vane having a pair of parallel grooves extending across its surface transversely to the direction of gas flow and spaced apart so as to form a lip between them, a high pressure air supply connected to the forward groove, and a fuel supply connected to the rearward groove, wherein high pressure air is discharged over the lip substantially normally to the direction of gas flow and fuel is discharged from the rearward groove to meet the high pressure air passing over the edge of the lip.

3. A combustion device according to claim 2 in which the forward groove has a flat front side with a plurality of holes spaced therealong and connected to a high pressure air supply so that air discharged from the holes is directed at the rear side of the groove.

4. A combustion device according to claim 3 in which the said rear side of the groove is curved and joined to the front side at the base of the groove.

5. A combustion device according to claim 2 in which a plurality of slots extends through the lip whereby some of the high pressure air is directed into the rearward groove so as to atomize fuel therein.

6. A combustion device according to claim 2 in which similar pairs of grooves are provided in opposite surfaces of the vane.

7. A combustion device according to claim 2 in which the vane is curved in profile and is disposed in an airflow duct adjacent to a bend in said duct.

References Cited

UNITED STATES PATENTS

| | | | |
|---|---|---|---|
| 2,948,117 | 8/1960 | Nerad et al. | 60—39.72 |
| 2,979,899 | 4/1961 | Salmon et al. | 60—39.72 |
| 3,328,958 | 7/1967 | Canuel | 60—39.72 |

FOREIGN PATENTS

| | | |
|---|---|---|
| 751,013 | 6/1956 | Great Britain. |

JULIUS E. WEST, Primary Examiner